UNITED STATES PATENT OFFICE.

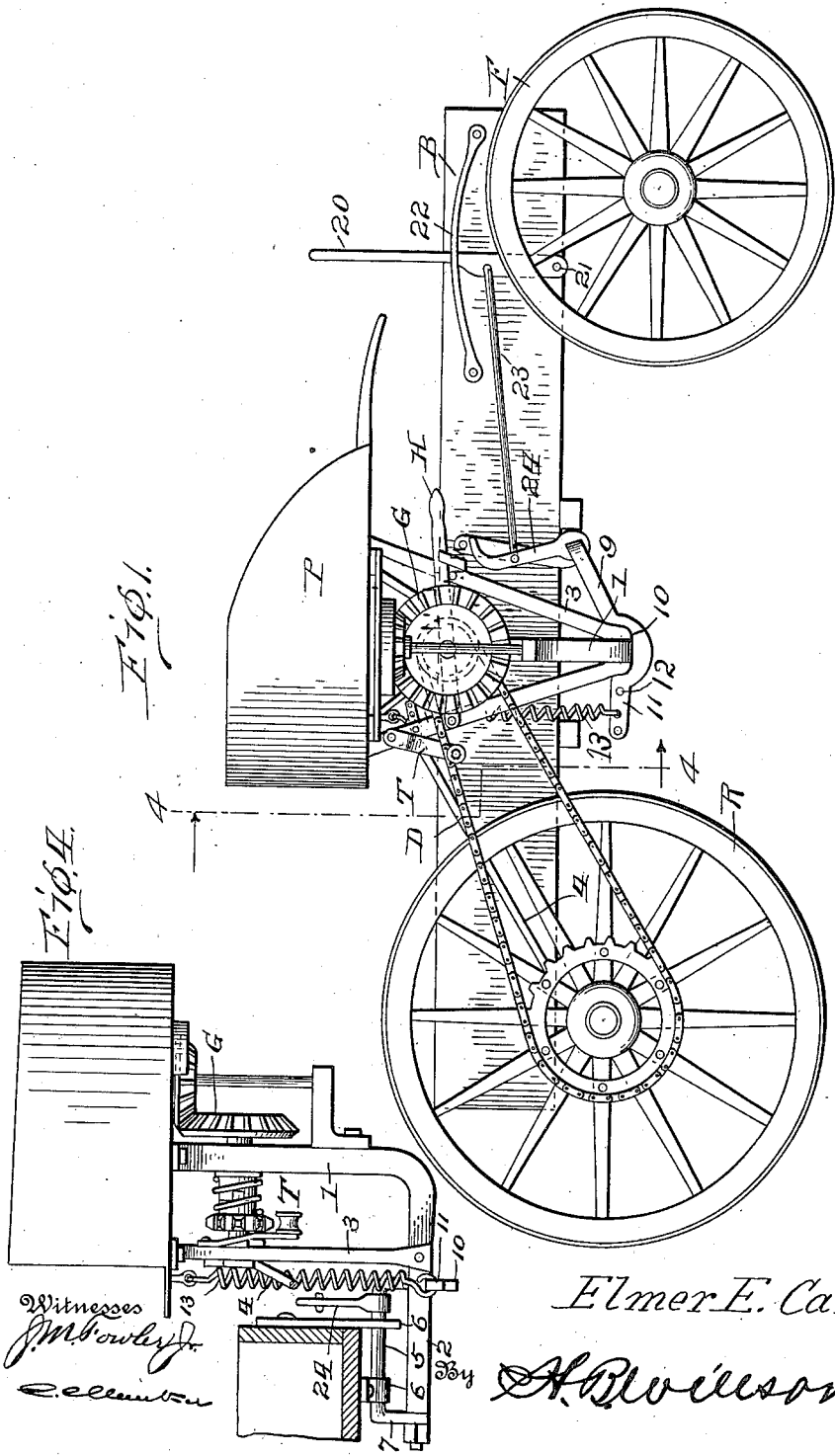

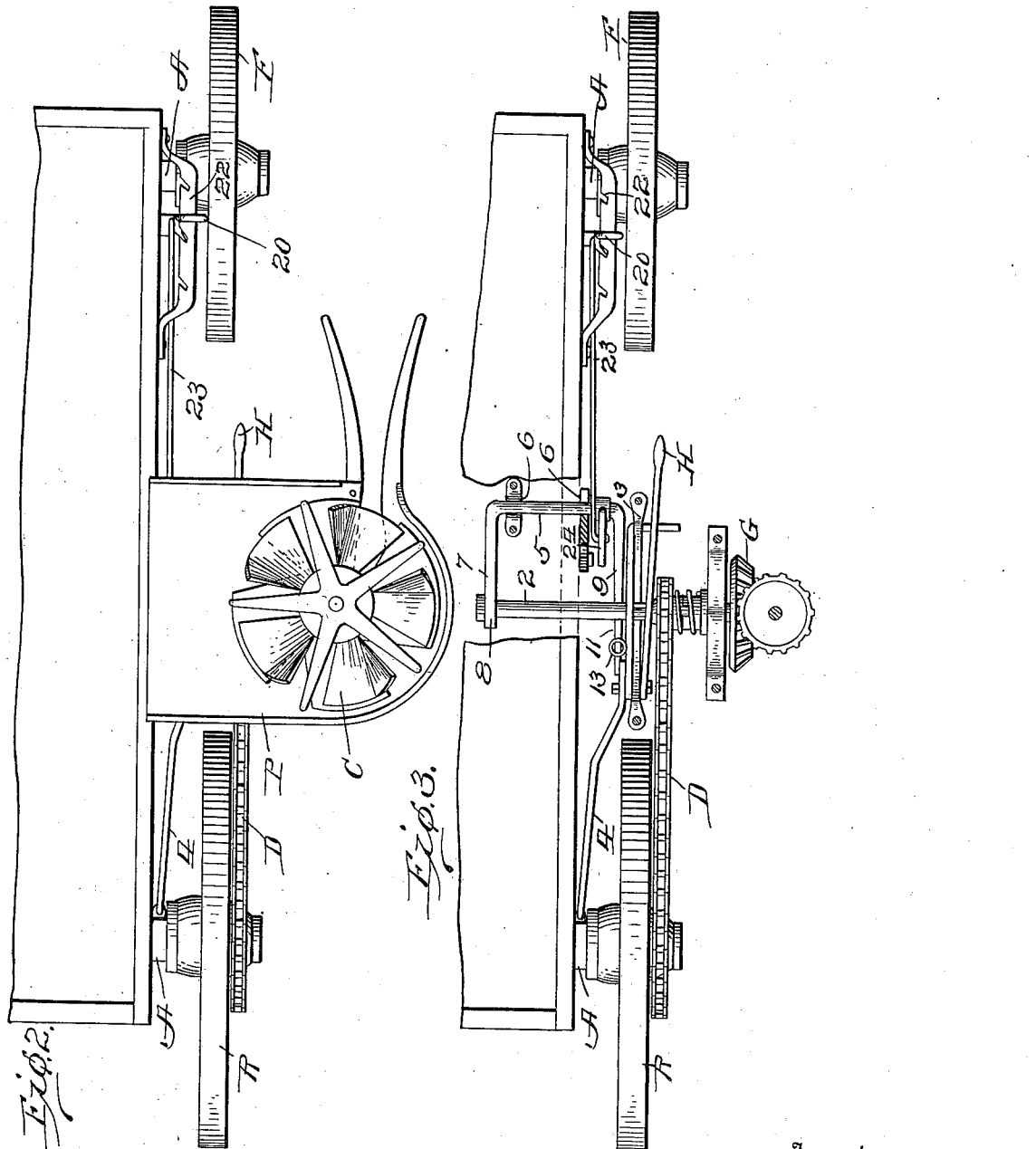

ELMER E. CANNON, OF WAUKOMIS, OKLAHOMA.

KAFIR-CORN TOPPER.

1,093,109.  Specification of Letters Patent.  Patented Apr. 14, 1914.

Application filed July 24, 1913. Serial No. 781,018.

*To all whom it may concern:*

Be it known that I, ELMER E. CANNON, a citizen of the United States, residing at Waukomis, in the county of Garfield and State of Oklahoma, have invented certain new and useful Improvements in Kafir-Corn Toppers; and I do declare the following to be a full, clear, and exact description of the invention, such as will enable others skilled in the art to which it appertains to make and use the same.

This invention relates to harvesters, and more especially to those adapted for cutting the tops off of Kafir corn and the like; and the object of the same is to improve the mechanism for adjusting the position of the pan, as disclosed in a former application for patent filed by me on January 6, 1913, and bearing Serial Number 740,490.

Details of the improvement forming the subject matter of the present application will be found in the following specification and claims, and are shown in the drawings wherein—

Figure 1 is a side elevation of this machine complete, Fig. 2 a plan view, Fig. 3 a plan view partly broken away, and Fig. 4 a sectional detail on the line 4—4 of Fig. 1.

As before I have shown the present invention as applied to an ordinary farm wagon whereof we are concerned only with the box or body B mounted on front and rear wheels F and R which in turn are journaled on axles A as usual. The cutting apparatus C is disposed within a pan P and driven by driving mechanism D, herein illustrated as a chain belt leading to a sprocket wheel fast on the hub of one rear supporting wheel R, the front end of the belt being connected through gearing G with said cutting apparatus and by suitable means which include a clutch adapted to be thrown open or closed by means of a hand lever H so that the driver can stop the movement of the cutting apparatus without checking the forward movement of the wagon. The belt is held taut by a belt tightener T.

No claim is made in the present application for the parts thus far described, as they are in all essential details the same as those embraced in my former application or at least they are not essentially of any exact structure so far as the invention of the present application is concerned.

The main framework consists of an L-shaped member whose upright arm 1 carries suitable journals for the driving mechanism and supports the pan, and whose horizontal arm 2 is carried inward under the wagon body B; and a V-shaped member 3 whose apex is secured upon said horizontal arm and whose upper ends are secured beneath the pan. A radius rod 4 pivotally connects the rear axle with one arm of the V-shaped member and stands along the length of the chain so that, with the belt tightener T, this chain is always held taut. Said framework is held in a U-shaped member which is disposed mostly beneath the wagon body B, its body 5 being mounted in bearings 6 carried by said wagon body B, its inner arm 7 projecting to the rear and pivotally receiving the inner end of the horizontal arm of said L-shaped member at 8, and its outer arm 9 projecting also to the rear but beyond the side of the wagon body, being depressed as at 10 into a half-bearing for receiving the horizontal arm 2 of said L-shaped member, and thence continuing farther to the rear in a finger 11 pierced with holes 12. A contractile spring 13 is adjustably connected at one end to one of said holes, and at its upper end to the pan P, and it is intended that a spring of such strength shall here be used and so adjusted that it will almost but not quite sustain the weight of the pan P and the mechanism carried thereby. It will be observed that the spring extends upward alongside the body B, as does the V-shaped member which directly supports the inner edge of the pan P, whereas nearly the whole of the U-shaped member stands beneath said wagon body and even its outer arm at the rear end 11 thereof does not rise alongside said wagon body except when the pan is adjusted to a quite high position.

For adjusting the position of the pan I make use of a hand lever 20 pivoted at 21 to the side of the wagon body B and moving over a toothed segment 22 at the right end of the driver's seat, this lever being connected by a rod 23 with an arm 24 upstanding rigidly from the body of the U-shaped member and at about right angles to its outer arm 9 with which it therefore constitutes in effect a bell-crank lever. When now the hand lever is moved forward, this bell-crank lever is turned, with the result that the arm 9 is raised and the depression 10 therein lifts the framework and the mechanism carried thereby; and meanwhile the inner arm 7 of said U-shaped member is also lifted as its body rocks in the bearings 6, and the inner end of the horizontal arm 2 of the L-shaped member is therefore raised at the same time and to the same extent that the outer end thereof is raised by the manipulation of the hand lever. The result is that the entire mechanism is raised around a center which is a line passing through the bearings 6, and meanwhile the upper portion of the pan swings around a center which is struck on the rear axle A where the radius rod 4 connects therewith. The main framework will therefore rise and fall alongside the wagon body B, and the bottom of the pan will be maintained ever in a horizontal line transverse to the wagon and nearly in a horizontal line along the side of the same. In this respect my present invention differs essentially from that set forth in my former application above referred to, because in that case the vertical adjustment of the pan causes its outer end to tip upward and downward so that transversely of the wagon it will not always maintain a strictly horizontal position. As is well known to those familiar with these machines, the adjustment last referred to is often made use of by the driver while the machine is progressing over the ground. Assuming, for instance, that he approaches a fertile spot where the ground is richer or dampness is more profuse, and here the Kafir corn grows quite tall; or assume that he approaches a spot or strip where the corn is stunted for some reason and grows with its heads near the ground. In either case it is his aim to cut the tops off the stalks, without cutting too much of the latter; and it will be obvious that by manipulating the hand lever he can raise or lower the pan and with it the cutting apparatus so as to instantly adjust the plane in which this machine makes its cut. The adjustment of the spring within the holes 12 in the finger 11 of the arm 9 will be useful in adapting the same once for all to the weight of parts, and perhaps giving the spring more tension if a boy is to drive the machine and who might not have sufficient strength to raise the pan. The adjustment of the tension of the chain belt is automatic by means of the belt tightener T.

I do not wish to be limited to the size, materials, or proportions of parts, but in any event the open inner end of the pan should extend over the side of the wagon body B, so that whether adjusted high or low, the material cut by the cutting apparatus C will be delivered into the wagon body as is usual with machines of this character.

What is claimed as new is:

1. In a topping machine of the class described, the combination with a wagon body and its running gear, a U-shaped member whose body portion is mounted in bearings beneath said wagon body and whose arms project to the rear, the outer arm having a depressed portion near its rear end, a framework comprising an L-shaped member whose horizontal arm rests in said depression and is pivoted at its inner end to the inner arm of said U-shaped member and a V-shaped member mounted on said horizontal arm, a pan mounted on said framework, and a contractile spring connecting the rear side of the pan with the rear end of the outer arm of said U-shaped member; of a radius rod pivotally connecting the rear axle of the wagon body with the rear arm of said V-shaped member, a cutting apparatus within the pan, driving connections therefor, and a sprocket chain connecting said connections with a sprocket wheel on the rear axle, for the purpose set forth.

2. In a topping machine of the class described, the combination with a wagon body and its running gear, a U-shaped member whose body portion is mounted in bearings beneath said wagon body and whose arms project to the rear, the outer arm having a depressed portion near its rear end, a framework comprising an L-shaped member whose horizontal arm rests in said depression and is pivoted at its inner end to the inner arm of said U-shaped member and a V-shaped member mounted on said horizontal arm, a pan mounted on said framework, and a contractile spring connecting the rear side of the pan with the rear end of the outer arm of said U-shaped member; of a radius rod pivotally connecting the vehicle axle with said framework, a driving wheel on one rear wheel of the wagon, a cutting apparatus within the pan, connections between said driving wheel and apparatus, and means for adjusting the U-shaped member within its bearings, for the purpose set forth.

3. In a topping machine of the class described, the combination with a wagon body and its running gear, a U-shaped member whose body portion is mounted in bearings beneath said wagon body and whose arms project to the rear, the outer arm having a depressed portion near its rear end, a framework comprising an L-shaped member whose horizontal arm rests in said depression and is pivoted at its inner end to the inner arm of said U-shaped member and a V-shaped member mounted on said horizontal arm, a pan mounted on said framework, and a contractile spring connecting the pan with the rear end of the outer arm of said U-shaped member; of a radius rod pivotally connecting the vehicle axle with said framework, a driving wheel on one rear wheel of the wagon, a cutting apparatus within the pan, connections between said driving wheel and apparatus, an arm upstanding from said U-shaped member, a hand lever pivoted to the wagon body and moving over a toothed sector, and a rod connecting said arm and hand lever, for the purpose set forth.

4. In a topping machine of the class described, the combination with a wagon body and its running gear, a U-shaped member whose body portion is mounted in bearings beneath said wagon body, and whose arms project to the rear, a framework comprising an L-shaped member whose horizontal arm is pivoted to the arms of said U-shaped member and whose upright arm stands alongside the wagon body, a pan mounted on said upright arm, a cutting apparatus therein, and driving mechanism for said apparatus; of a driving wheel on the hub of one rear wagon wheel, connections between this driving wheel and said driving mechanism, a radius rod connecting the axle of said wheel with said framework, and means for raising and lowering the framework and the parts carried thereby.

5. In a topping machine of the class described, the combination with a wagon body and its running gear, a U-shaped member whose body portion is mounted in bearings on said wagon and whose arms project to the rear, a framework comprising an L-shaped member whose horizontal arm is pivoted to the arms of said U-shaped member and whose upright arm stands alongside the wagon body, a pan mounted on said upright arm, a cutting apparatus therein, and driving mechanism for said apparatus; of a driving wheel on the hub of one rear wagon wheel, connections between this driving wheel and said driving mechanism, a radius rod connecting the axle of said wheel with said framework, a spring connecting said pan with one arm of said U-shaped member and of a strength nearly sufficient to overcome the weight of parts carried thereby, and a hand lever for assisting the operation of said spring.

6. In a topping machine of the class described, the combination with a wagon body and its running gear, a U-shaped member whose body portion is mounted in bearings on said wagon and whose arms project to the rear, a framework comprising an L-shaped member whose horizontal arm is pivoted to the arms of said U-shaped member and whose upright arm stands alongside the wagon body, a pan mounted on said upright arm, a cutting apparatus therein, and driving mechanism for said apparatus; of a driving wheel on the hub of one rear wagon wheel, connections between this driving wheel and said driving mechanism, a radius rod connecting the axle of said wheel with said framework, a hand lever pivoted to said wagon body, and a rod connecting said hand lever and the U-shaped member for raising the latter and the parts carried by said L-shaped member.

In testimony whereof I have hereunto set my hand in presence of two subscribing witnesses.

ELMER E. CANNON.

Witnesses:
T. B. AVERY,
S. W. WREN.

Copies of this patent may be obtained for five cents each, by addressing the "Commissioner of Patents, Washington, D. C."